United States Patent
Horita

(10) Patent No.: US 11,935,143 B2
(45) Date of Patent: Mar. 19, 2024

(54) STRUCTURE REPAIR METHOD SELECTION SYSTEM, STRUCTURE REPAIR METHOD SELECTION METHOD, AND STRUCTURE REPAIR METHOD SELECTION SERVER

(71) Applicant: FUJIFILM Corporation, Tokyo (JP)

(72) Inventor: Shuhei Horita, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 408 days.

(21) Appl. No.: 17/324,558

(22) Filed: May 19, 2021

(65) Prior Publication Data

US 2021/0272263 A1 Sep. 2, 2021

Related U.S. Application Data

(63) Continuation of application No. PCT/JP2019/042731, filed on Oct. 31, 2019.

(30) Foreign Application Priority Data

Nov. 29, 2018 (JP) ................... 2018-223787

(51) Int. Cl.
*G06Q 50/08* (2012.01)
*E01D 22/00* (2006.01)
(Continued)

(52) U.S. Cl.
CPC ......... *G06Q 50/08* (2013.01); *G06F 16/5866* (2019.01); *G06F 18/22* (2023.01);
(Continued)

(58) Field of Classification Search
CPC ............ G06N 5/04; G06N 20/00; G06N 3/04; G06N 3/08; F24C 3/128; F24C 7/085;
(Continued)

(56) References Cited

U.S. PATENT DOCUMENTS 11,087,450 B1 * 8/2021 Bitton ................... G06F 16/56
2018/0189423 A1 7/2018 Nonaka et al.
(Continued)

FOREIGN PATENT DOCUMENTS

CN 104088472 A 10/2014
CN 108027949 A 5/2018
(Continued)

OTHER PUBLICATIONS

An Office Action mailed by the Chinese Patent Office dated Jun. 30, 2022, which corresponds to Chinese Patent Application No. 201980078209.0 and is related to U.S. Appl. No. 17/324,558.
(Continued)

*Primary Examiner* — Mia M Thomas
(74) *Attorney, Agent, or Firm* — Studebaker & Brackett PC

(57) ABSTRACT

A structure repair method selection system includes a repair evaluation unit that obtains an evaluation score for a structure after repair, a database that has data of a captured image of the structure and the evaluation score, an image acquisition unit that acquires a captured image of a target structure to be repaired, a damage detection unit that detects damage from the captured image, a similar damage extraction unit that extracts similar damage similar to the damage by using the database, and a repair method presentation unit that presents, based on the evaluation score, repair methods used for the similar damage. Also provided are a repair method selection method that uses the structure repair method selection system, and a repair method selection server.

19 Claims, 7 Drawing Sheets

(51) Int. Cl.
  *G06F 16/58* (2019.01)
  *G06F 18/22* (2023.01)
  *G06T 3/40* (2006.01)
  *G06T 7/00* (2017.01)
(52) U.S. Cl.
  CPC .......... *G06T 3/4038* (2013.01); *G06T 7/0002* (2013.01); *E01D 22/00* (2013.01); *G06T 2207/20212* (2013.01); *G06T 2207/30184* (2013.01)
(58) Field of Classification Search
  CPC .................. F24C 7/083; G06T 7/0004; G06T 2207/2008; G06T 2207/20084; G06T 2207/30128; A47J 36/321
  See application file for complete search history.

(56) References Cited

U.S. PATENT DOCUMENTS

| | | | |
|---|---|---|---|
| 2018/0189750 A1* | 7/2018 | Nonaka | G06T 7/0004 |
| 2020/0023887 A1 | 1/2020 | Sasaki et al. | |
| 2020/0034958 A1* | 1/2020 | Campbell | G06Q 10/10 |
| 2020/0146646 A1* | 5/2020 | Tuzoff | G06V 10/945 |
| 2020/0158656 A1* | 5/2020 | Chung | B61L 23/047 |
| 2020/0242853 A1* | 7/2020 | Hagerty | G06T 7/0004 |
| 2020/0349695 A1* | 11/2020 | Horita | G01N 21/892 |
| 2021/0209422 A1* | 7/2021 | Horita | G06V 10/50 |
| 2022/0036537 A1* | 2/2022 | Johnson | G06V 20/56 |
| 2023/0112828 A1* | 4/2023 | Horita | G06T 7/0004 356/237.1 |
| 2023/0260098 A1* | 8/2023 | Horita | G06Q 10/00 345/419 |

FOREIGN PATENT DOCUMENTS

| | | |
|---|---|---|
| CN | 108431585 A | 8/2018 |
| EP | 3 355 259 A1 | 8/2018 |
| EP | 3 396 358 A1 | 10/2018 |
| JP | 2002-024323 A | 1/2002 |
| JP | 2005-339249 A | 12/2005 |
| JP | 2006-009571 A | 1/2006 |
| JP | 2006-177080 A | 7/2006 |
| JP | 2007-140608 A | 6/2007 |
| JP | 2016-099235 A | 5/2016 |
| JP | 2017-228208 A | 12/2017 |
| WO | 2017/051550 A1 | 3/2017 |
| WO | 2018/051550 A1 | 3/2018 |

OTHER PUBLICATIONS

The extended European search report issued by the European Patent Office dated Jan. 26, 2022, which corresponds to European Patent Application No. 19891626.4-1222 and is related to U.S. Appl. No. 17/324,558.

An Office Action; "Notice of Reasons for Refusal," mailed by the Japanese Patent Office dated Aug. 22, 2022, which corresponds to Japanese Patent Application No. 2020-558215 and is related to U.S. Appl. No. 17/324,558; with English language translation.

International Search Report issued in PCT/JP2019/042731; dated Jan. 21, 2020.

International Preliminary Report on Patentability and Written Opinion issued in PCT/JP2019/042731; dated May 25, 2021.

* cited by examiner

STRUCTURE REPAIR METHOD SELECTION SYSTEM, STRUCTURE REPAIR METHOD SELECTION METHOD, AND STRUCTURE REPAIR METHOD SELECTION SERVER

CROSS-REFERENCE TO RELATED APPLICATIONS

This application is a Continuation of PCT International Application No. PCT/JP2019/042731 filed on Oct. 31, 2019, which claims priority under 35 U.S.C § 119(a) to Japanese Patent Application No. 2018-223787 filed on Nov. 29, 2018. Each of the above application(s) is hereby expressly incorporated by reference, in its entirety, into the present application.

BACKGROUND OF THE INVENTION

1. Field of the Invention

The present invention relates to a structure repair method selection system, a structure repair method selection method, and a structure repair method selection server. More particularly, the present invention relates to a repair method selection system, a repair method selection method, and a repair method selection server that select a repair method on the basis of a state such as damage of a structure such as a bridge.

2. Description of the Related Art

Inspections need to be periodically performed on social infrastructure such as bridges. In a bridge repair design, an engineer determines a repair time and selects a repair method on the basis of a state of damage, a cause of the damage, and the like obtained in these inspections.

Since advanced skills and experience are required to identify damage to be repaired, identify an appropriate repair time, and select an appropriate repair method, the results vary among inspectors (diagnosis-making persons). Thus, appropriate repair is not necessarily made. Shortage of skilled engineers is also a factor that hinders appropriate repair from being made. In addition, in terms of budget management, if a method actually performed differs from the repair method selected at the time of the repair design, a deviation from budget occurs, which leads to unsuccessful budget management.

As a system for creating a repair plan, for example, WO2017/051550A discloses a repair-planning assisting system, a repair-planning assisting method, and a repair-planning assisting program for creating a repair plan for a target structure by receiving an inspection result and comparing the inspection result with past inspection and repair results of a reference structure. In this manner, creation of an objective and highly accurate repair plan can be efficiently assisted.

SUMMARY OF THE INVENTION

However, in the repair-planning assisting system and the like described in WO2018/051550A, repair result information of the reference structure similar to the inspection result information is displayed and a past post-repair inspection result is not reflected. Therefore, it cannot be determined whether the repair method is appropriate in terms of a long-term evaluation after the repair.

The present invention is made in view of such a circumstance, and an object of the present invention is to provide a structure repair method selection system, a structure repair method selection method, and a structure repair method selection server that enable selection of a more appropriate repair method.

To accomplish the object of the present invention, a structure repair method selection system according to an aspect of the present invention includes a repair evaluation unit that obtains an evaluation score for a structure from an inspection history of the structure after repair: a database that has data of a captured image of the structure before the repair, an adopted repair method, a repair time, the inspection history of the structure after the repair, and the evaluation score; an image acquisition unit that acquires a captured image of a target structure to be repaired; an actual size information acquisition unit that acquires an actual size of a characteristic portion of the target structure in the captured image or an actual length of the target structure; a damage detection unit that detects damage from the captured image acquired by the image acquisition unit, and calculates a degree of the damage, based on information acquired by the actual size information acquisition unit; a similar damage extraction unit that determines a degree of similarity of the damage detected by the damage detection unit to damage of the structure in the database, and extracts one or more kinds of similar damage for which the degree of similarity is high; and a repair method presentation unit that presents, based on the evaluation score, repair methods adopted for the kinds of similar damage extracted by the similar damage extraction unit.

To accomplish the object of the present invention, a structure repair method selection method according to the present invention includes a repair evaluation step of, with a repair evaluation unit, obtaining an evaluation score for a structure from an inspection history of the structure after repair, an image acquisition step of, with an image acquisition unit, acquiring a captured image of a target structure to be repaired; an actual size information acquisition step of, with an actual size information acquisition unit, acquiring an actual size of a characteristic portion of the target structure in the captured image or an actual length of the target structure; a damage detection step of, with a damage detection unit, detecting damage from the captured image acquired in the image acquisition step, and calculating a degree of the damage, based on information acquired in the actual size information acquisition step; a similar damage extraction step of, with a similar damage extraction unit, by using a database having data of a captured image of the structure before the repair, an adopted repair method, a repair time, the inspection history of the structure after the repair, and the evaluation score, determining a degree of similarity of the damage detected in the damage detection step to damage of the structure in the database, and extracting one or more kinds of similar damage for which the degree of similarity is high; and a repair method presentation step of, with a repair method presentation unit, based on the evaluation score, presenting repair methods adopted for the kinds of similar damage extracted in the similar damage extraction step.

To accomplish the object of the present invention, a structure repair method selection server according to the present invention is a structure repair method selection server that is connected to a user terminal via a network and selects a repair method for a target structure to be repaired and that includes a repair evaluation unit that obtains an evaluation score for a structure from an inspection history of the structure after repair; a database that has data of a captured image of the structure before the repair, an adopted repair method, a repair time, the inspection history of the structure after the repair, and the evaluation score: an image acquisition unit that acquires a captured image of the target structure; an actual size information acquisition unit that acquires an actual size of a characteristic portion of the target structure in the captured image or an actual length of the target structure; a damage detection unit that detects damage from the captured image acquired by the image acquisition unit, and calculates a degree of the damage, based on information acquired by the actual size information acquisition unit; a similar damage extraction unit that determines a degree of similarity of the damage detected by the damage detection unit to damage of the structure in the database, and extracts one or more kinds of similar damage for which the degree of similarity is high; a repair method presentation unit that presents, based on the evaluation score, repair methods adopted for the kinds of similar damage extracted by the similar damage extraction unit: and a communication unit having a reception unit that receives the captured image from the user terminal via the network, and a transmission unit that transmits the repair methods presented by the repair method presentation unit to the user terminal.

The structure repair method selection system according to the present invention has the repair evaluation unit, and the database includes repair evaluation scores obtained by the repair evaluation unit. When a repair method is selected, the repair method is selected in consideration of these evaluation scores. Consequently, the repair method for damage detected from an acquired image can be appropriately selected. The same advantage can be obtained also with the structure repair method selection method and the structure repair method selection server.

DESCRIPTION OF THE PREFERRED EMBODIMENTS

A structure repair method selection system, a structure repair method selection method, and a structure repair method selection server according to one embodiment of the present invention will be described below with reference to the accompanying drawings.

Structure of Bridge

Figure 1:
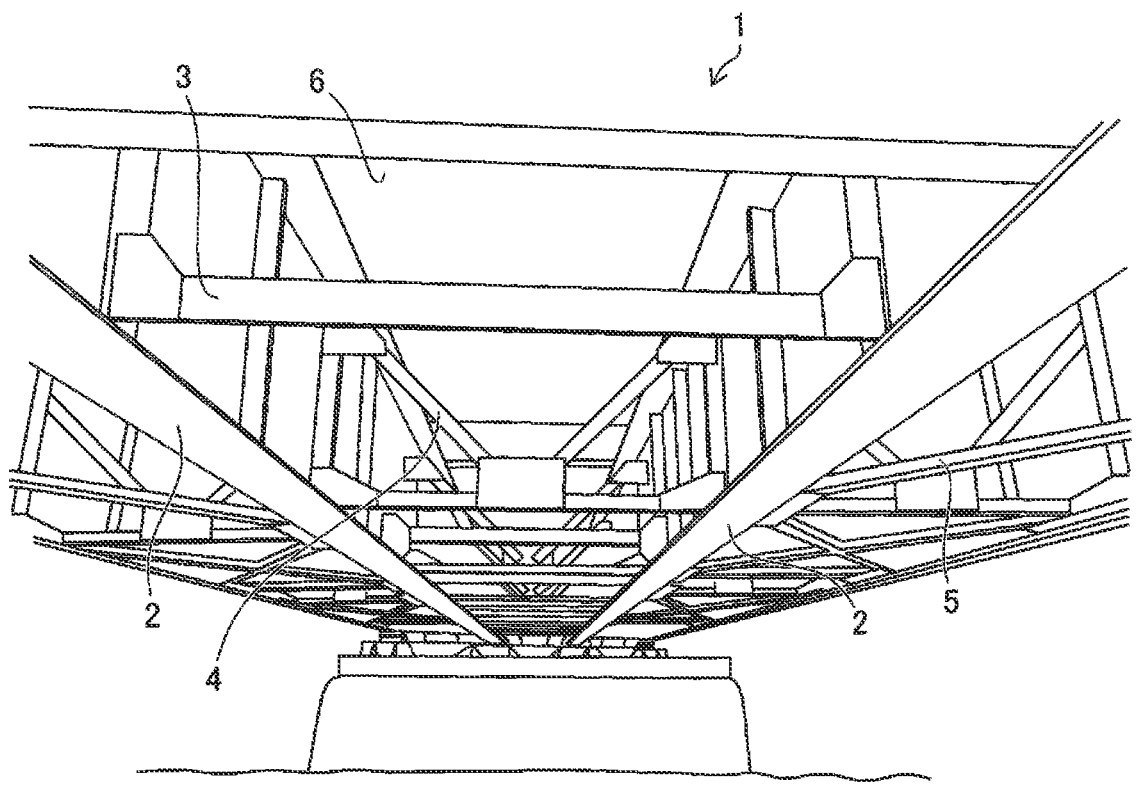
FIG. 1 is an external view of a bridge viewed from below.

FIG. 1 is a perspective view of a bridge 1, which is a structure, viewed from below. The bridge 1 illustrated in FIG. 1 has a three-dimensional structure constituted by main girders 2, cross beams 3, sway bracings 4, lateral bracing 5, and deck slabs 6. These members are connected to each other with bolts, rivets, welding, and so on. The deck slabs 6 on which vehicles or the like travel are placed above the main girders 2 and so on. As the deck slabs 6, reinforced concrete deck slabs are typically used. The main girders 2 are members laid between abutments or piers to support the load of vehicles or the like on the deck slabs 6. The main girders 2 have surfaces (vertical surfaces) orthogonal to surfaces (horizontal surfaces) of the deck slabs 6. The cross beams 3 are members that connect the plurality of main girders 2 to each other so that the main girders 2 support the load. The sway bracings 4 and the lateral bracings 5 are members that connect the main girders 2 to each other to resist the lateral load imposed by winds and earthquakes. In the present embodiment, the structure is not limited to a bridge, and may be a tunnel, a building, a road and the like.

Structure Repair Method Selection System

Figure 2:
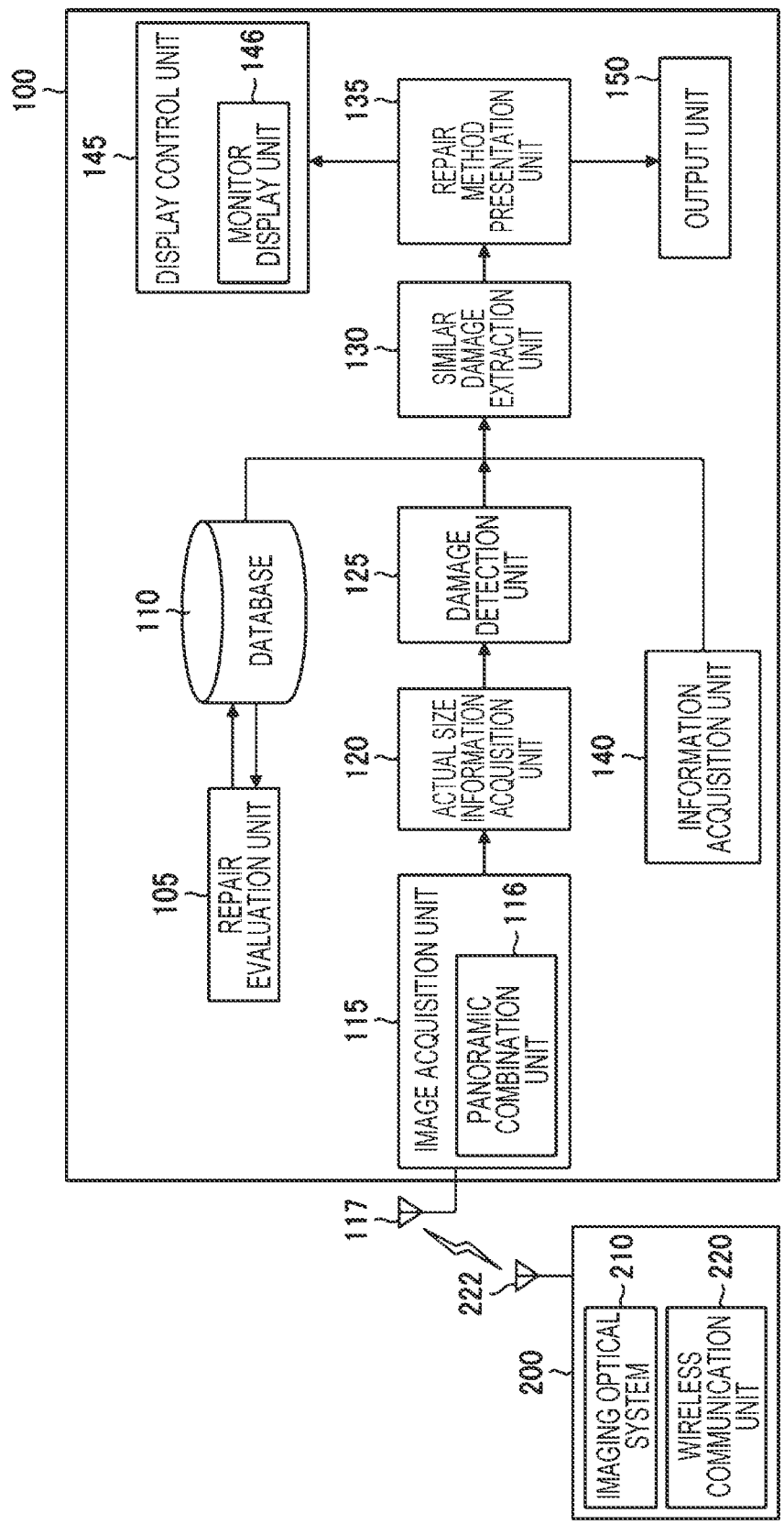
FIG. 2 is a block diagram illustrating a configuration of a structure repair method selection system.

FIG. 2 is a block diagram illustrating schematic configurations of a repair method selection system 100 according to one embodiment of the present invention and of a digital camera 200.

The repair method selection system 100 according to the present embodiment has a repair evaluation unit 105, a database 110, an image acquisition unit 115, an actual size information acquisition unit 120, a damage detection unit 125, a similar damage extraction unit 130, and a repair method presentation unit 135. The repair method selection system 100 may include an information acquisition unit 140, a display control unit 145, and an output unit 150. The information acquisition unit 140 acquires information on a target structure to be repaired, namely, other information such as a damage cause and structure information held in association with the structure in the database 110. The display control unit 145 displays repair methods. The output unit 150 outputs the repair methods.

The repair method selection system 100 is a system that detects damage to be repaired from an image obtained by capturing an image of a target structure to be repaired, and selects a repair method for the damage. The repair method selection system 100 is applicable to a digital camera, a smartphone, a tablet terminal, a personal computer, and the like. The image acquired by the image acquisition unit 115 can be captured by the digital camera 200. The digital camera 200 may be placed in a housing different from that of the repair method selection system 100, or may be integrated with the repair method selection system 100. The digital camera 200 may be incorporated as a portion of the repair method selection system 100 and may constitute the structure repair method selection system according to the present embodiment.

Configuration of Digital Camera

The digital camera 200 captures an image with an imaging optical system 210 including an imaging lens (not illustrated) and an imaging element (not illustrated). Examples of the imaging element include a charge coupled device (CCD) imaging element and a complementary metal-oxide semiconductor (CMOS) imaging element. Color filters of red (R), green (G), and blue (B) are disposed on a light-receiving surface of the imaging element. Thus, the imaging element is capable of acquiring a color image of a photographic subject on the basis of signals of the respective colors. The digital camera 200 wirelessly communicates with the repair method selection system 100 via a wireless communication unit 220 and an antenna 222, so that the captured image is input to the image acquisition unit 115 and is subjected to processing described below.

If an image of the entire structure or portion serving as a photographic subject cannot be captured in a single image-capturing operation performed with the digital camera 200, a group of images is acquired by capturing images of segments of the structure or portion serving as the photographic subject. The image acquisition unit 115 includes a panoramic combination unit 116 and may use an image resulting from panoramic combination processing performed on the group of images by the panoramic combination unit 116. The digital camera 200 may be, for example, a general-purpose compact digital camera having the number of pixels of about 5000×4000 pixels.

Each Constituent of Structure Repair Method Selection System

The repair method selection system 100 is constituted mainly by the repair evaluation unit 105, the database 110, the image acquisition unit 115, the actual size information acquisition unit 120, the damage detection unit 125, the similar damage extraction unit 130, and the repair method presentation unit 135. These are connected to each other to transmit and receive necessary information. The repair method selection system 100 wirelessly communicates with the digital camera 200 via an antenna 117, and acquires a captured image captured by the digital camera 200.

Repair Evaluation Unit

The repair evaluation unit 105 obtains an evaluation score for a structure from an inspection history of the structure after repair. A method and criteria used for obtaining an evaluation score for a structure can be appropriately set depending on the structure to be evaluated, the use state of the structure, or the like. The evaluation score for a structure may be evaluated in units of members inspected in an inspection after the repair or may be evaluated for the entire structure. When the evaluation is made for the entire structure, evaluations may be made for individual members and an average value of the evaluations may be obtained. When the average value is obtained, the evaluations may be weighted in accordance with the degrees of importance of the respective members and an average value of the weighted evaluations may be obtained. Alternatively, the lowest evaluation score obtained in the evaluations made for the individual members may be adopted as the evaluation score for evaluating the entire structure.

Figure 3:
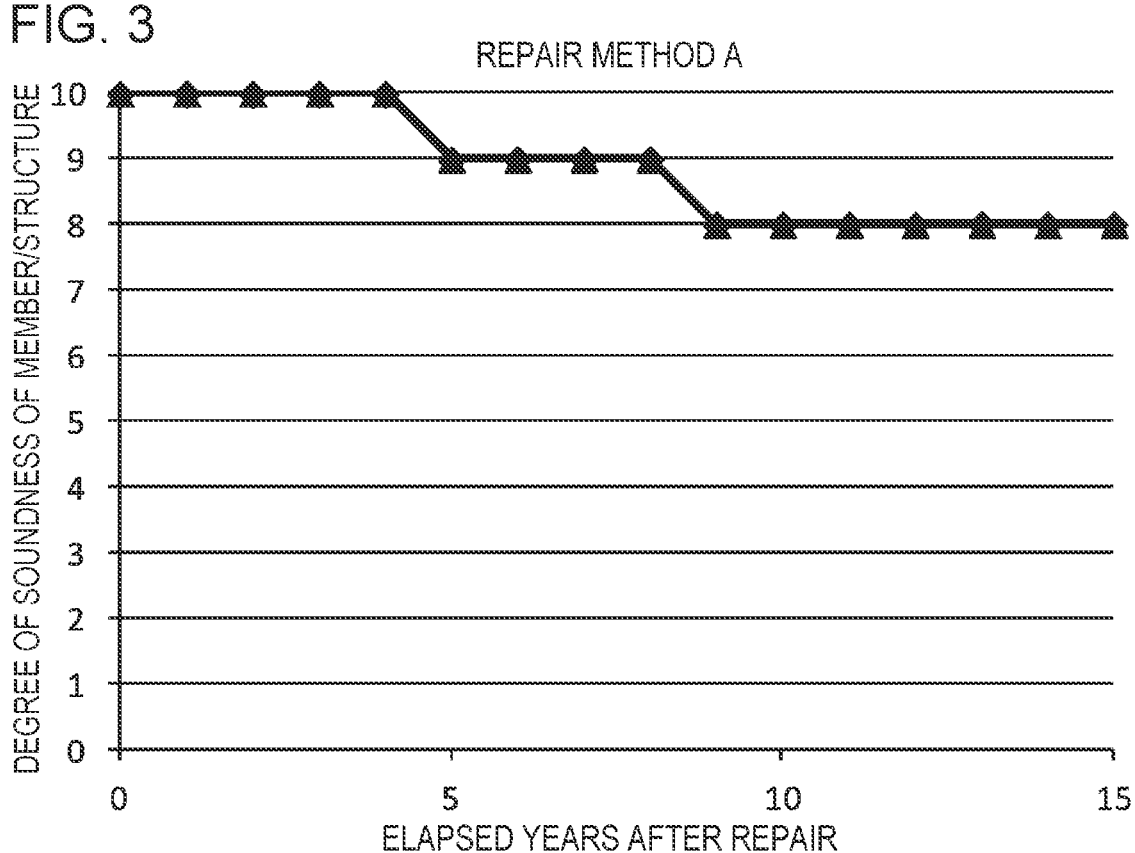
FIG. 3 is a diagram illustrating a chronological change in a degree of soundness achieved by a repair method A.
Figure 4:
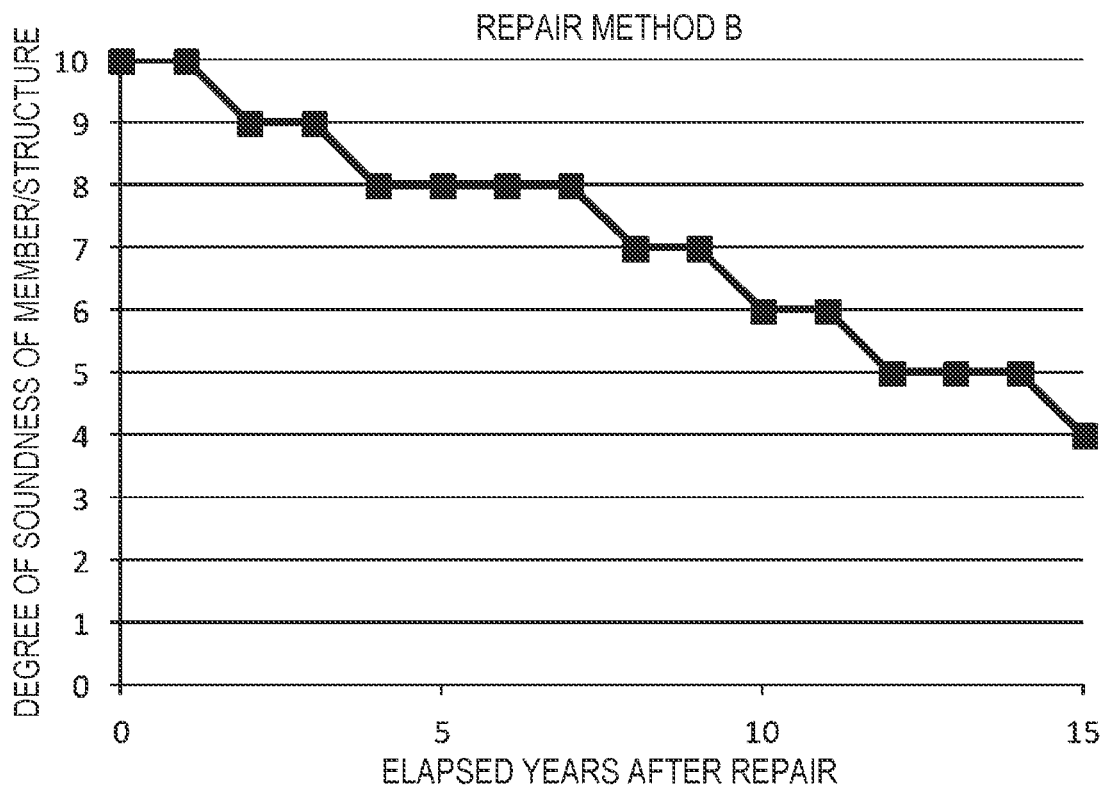
FIG. 4 is a diagram illustrating a chronological change in a degree of soundness achieved by a repair method B.

The following is an example of a method for obtaining an evaluation score for a structure. FIGS. 3 and 4 are diagrams obtained by plotting the rank of a degree of soundness of a member or structure on a vertical axis and plotting the number of elapsed years after the repair on a lateral axis. FIG. 3 illustrates a result for a repair method A, and FIG. 4 illustrates a result for a repair method B. As illustrated in FIGS. 3 and 4, the repair of a structure can be evaluated by plotting the degree of soundness against the number of elapsed years and obtaining an integral value of this graph. It can be determined that the greater the integral value is, the longer the high rank can be maintained. Thus, the effect of the repair can be evaluated to be high. This evaluation score obtaining method is used when a repair method that achieves a high degree of soundness for a long time is selected.

Another evaluation method is a method of obtaining an average value of the rank of the degree of soundness in units of years. When evaluation is made using the integral value, the more the years elapse, the greater the integral value becomes. When evaluation is made using the average value, the more the years elapse, the lower the rank becomes. Thus, the average value decreases. Accordingly, the evaluation score can also be obtained by defining the number of years for which the evaluation score is to be obtained.

When the evaluation score is obtained, the cost, working time, and the like for the repair can be reflected in the evaluation score.

As for the ranks of the degree of soundness illustrated in FIGS. 3 and 4, four or five ranks are defined in "Periodic Bridge Inspection Guidelines" (2014) of the Ministry of Land, Infrastructure, Transport and Tourism as ratings of the inspection and diagnosis results in terms of the damage rank (a degree of damage) (a, b, c, d, and e), determination of the countermeasure class (A, B, C. D, and E), the degree of soundness in units of members (I, II, III, and IV), and the degree of soundness of in units of bridges (1, II, III, and IV). An evaluation value about effectiveness of the repair can be calculated by converting these ranks into numerical values so that a better rank is assigned a larger value and a worse rank is assigned a smaller value, and can be used in calculation of the evaluation score. Ratings of the degree of soundness are defined in ten steps (9 to 0) by National Bridge Inventory (NBI) Rating Scale for bridge inspections in the United State. These ranks may be used when a reference evaluation score is created.

In addition to the above-described method that uses the ranks of the degree of soundness, the progress history on the position of damage and the degree of damage may be checked from images captured at predetermined intervals, and the evaluation score for a structure may be directly evaluated using this progress history. The progress history on the position of the damage and the degree of the damage may be, for example, a change in the total extension of a crack, a change in the maximum crack width, a change in the crack density, or whether or not damage is caused in a structurally important portion.

Database

The database 110 is a recording means in which a captured image of a structure before repair, an adopted repair method, a repair time, an inspection history of the structure after the repair, and the evaluation score obtained by the repair evaluation unit are stored.

In the case of repair methods for a concrete member, examples of the adopted repair method include a crack repair method (crack injection, crack filling), a cross-section repair method (plastering, spraying, filling), a surface treatment method (surface coating, surface impregnation), a replacement method, a flaking prevention method, an electrolytic protection method, a desalination method, a re-alkalization method, a waterproofing method, and so on. In the case of repair methods for a steel member, examples of the adopted repair methods include a splice-plate reinforcement method, a member replacement method, a repainting method, a waterproofing method, a water cut-off method, a drilled hole method, a welding repair method, bolt replacement, and so on. Since the repair performance varies depending on not only the type of the repair method but also the type (a manufacturer and a model number) of a repairing material to be adopted, the repairing material is also preferably included.

The repair time includes information on the number of days or years elapsed from the start of the use of the structure, the number of days or years elapsed from the last inspection date, and the acquisition date of the image.

The evaluation score is the above-described evaluation score obtained by the repair evaluation unit. The evaluation score is obtained by inspecting the structure after the repair.

The information stored in the database 110 can include damage information of the structure. The damage information of the structure can include a type of damage, a position of the damage, a degree of the damage (such as a length, a width, an area, a density, a depth, or the like, or an average value or a maximum value of these values).

The information stored in the database 110 may include, as other information, a damage cause, structure information, environment information, and history information. As damage causes of a concrete member, example of the damage cause include (1) deterioration due to fatigue (repeatedly imposed load), salt, neutralization, alkali-silica reaction, frost damage, chemical erosion, and so on: (2) construction-relating factors such as heat of hydration and drying shrinkage caused during construction: and (3) structural factors such as application of an excessive external force and an inappropriate design. As damage causes of a steel member, examples of the damage cause include (1) deterioration due to fatigue (repeatedly imposed load), salt, and so on; and (2) structural factors such as application of an excessive external force and an inappropriate design.

Examples of the structure information include (1) a type of the structure which is, for example, a girder bridge, a rigid-frame bridge, a truss bridge, an arch bridge, a cable-stayed bridge, a suspension bridge, or the like in the case of a bridge; (2) a type of a member which is, for example, a deck slab, a pier, an abutment, a girder, or the like in the case of a bridge: and (3) a material, which is, for example, steel, reinforced concrete, prestressed concrete (PC), or the like.

Examples of the environment information include a daily, monthly, yearly, or cumulative volume of traffic, a distance from the sea, and climates such as an average temperature, an average humidity, a rainfall, and a snowfall.

Examples of the history information include construction conditions such as temperatures during construction: the number of elapsed years; a repair history; a disaster history of earthquakes, typhoons, floods, and so on: and monitoring information on deflection, a vibration amplitude, a vibration period, and so on.

Image Acquisition Unit

The image acquisition unit 115 acquires a captured image of a target structure to be repaired. As the captured image, an image is acquired in units of structures or in units of members of the target structure.

The image acquisition unit 115 acquires a captured image of the bridge 1 from the digital camera 200 (or a recording medium, a network, or the like). The captured image may be an image obtained by capturing the entire structure in a single image-capturing operation, or may be a plurality of images obtained by capturing images of segments of the target structure as a group of images when a region for which the captured image is to be acquired cannot be covered by a single image-capturing operation with a predetermined resolution. When a plurality of images are acquired, the panoramic combination unit 116 performs panoramic combination processing. In the panoramic combination processing, correspondence points between images are detected, and the captured images are combined together on the basis of the correspondence points between the images.

The image acquisition unit 115 may periodically acquire the captured image of the target structure to acquire chronological images of the target structure. When detecting similar damage, the similar damage extraction unit 130 described later can also use a chronological change in the target structure to determine the degree of similarity. Note that it is sufficient that at least an image at the previous inspection and an image at the current inspection are acquired as the chronological images.

Actual Size Information Acquisition Unit

The actual size information acquisition unit 120 acquires an actual size of a characteristic portion of the target structure in the captured image acquired by the image acquisition unit 115 or an actual length of the target structure. In a method for obtaining an actual length of a structure, the actual length of the target structure can be obtained by acquiring a resolution representing a length of the target structure per unit pixel of the captured image. In another method, the actual length of the target structure can be obtained by capturing an image of the structure together with an object with which the length of the structure is obtained, or by capturing an image by projecting a scale.

Damage Detection Unit

The damage detection unit 125 detects damage from the captured image acquired by the image acquisition unit 115. The damage detection unit 125 also calculates a degree of the damage on the basis of information acquired by the actual size information acquisition unit 120.

In the case where the structure is a concrete member, the damage detection unit 125 detects, as damage to be detected, damage such as a crack, water leakage, free lime, peeling, exposure of a reinforcement steel, and delamination. In the case where the structure is a steel member, the damage detection unit 125 detects damage such as fracture, corrosion, and deterioration of anti-corrosion function. The damage detection unit 125 detects any one or more of these kinds of damage.

The detection can be performed through detection using a machine-learning-based detector and a detection algorithm.

For example, items to be measured for detecting a crack include a position, a size, a direction, a range, a shape, and the like. These items can be set according to conditions such as a type and characteristics of the structure. A crack can be detected by using various methods. For example, a crack detection method described in JP4006007B can be used. This method is a crack detection method having a step of creating a wavelet image and a step of determining a crack region on the basis of the wavelet image. In the step of creating a wavelet image, a wavelet coefficient corresponding to two densities to be compared is calculated, wavelet coefficients in the cases where the two densities are each changed are calculated to create a wavelet coefficient table, and wavelet transform is performed on an input image obtained by capturing an image of a concrete surface subjected to crack detection. In the step of determining a crack region, a wavelet coefficient corresponding to an average density of neighboring pixels in a local region and to a density of a pixel of interest in the wavelet coefficient table is set as a threshold value, and a crack region and a non-crack region are determined by comparing the wavelet coefficient of the pixel of interest with the threshold value.

Similar Damage Extraction Unit

The similar damage extraction unit 130 determines a degree of similarity on the basis of the type of the damage, the position of the damage, and the degree of the damage, and extracts one or more kinds of similar damage having high degrees of similarity from the database 110.

The similar damage extraction unit 130 may determine the degree of similarity on the basis of chronological changes in the position of the damage and the degree of damage in addition to the damage information. The similar damage extraction unit 130 may determine the degree of similarity on the basis of any one or more of the structure information, the environment information, the history information, the disaster information, and the inspection information in the database 110, and extract similar damage.

In determination of the degree of similarity, a distance between damage of an inspection-target structure and damage of another structure stored in the database is calculated in a feature space having the above information as feature vectors. Damage having this distance equal to or less than a certain threshold value is extracted as similar damage.

Figure 5:
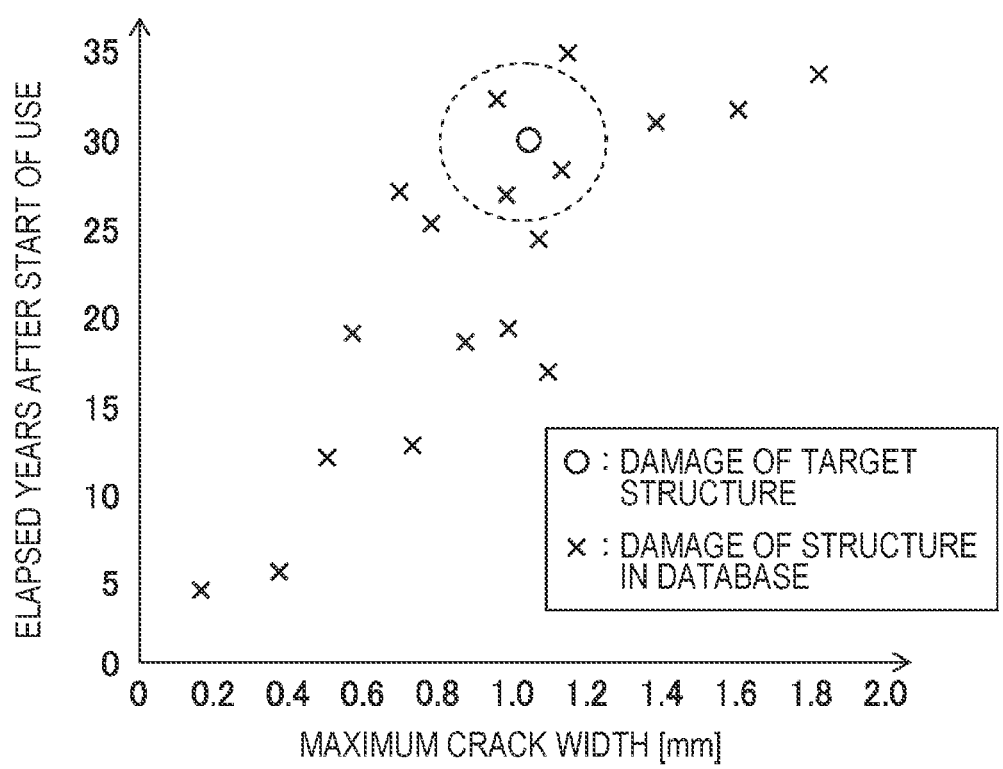
FIG. 5 is a graph illustrating a concept of determining a degree of similarity of damage.

FIG. 5 is a graph illustrating a concept of determining a degree of similarity. The feature space defined by feature vectors can be a multi-dimensional space defined by parameters selected from the group consisting of the type of the damage, the position of the damage, the degree of the damage, chronological changes in the position of the damage and the degree of damage, the structure information, the environment information, the history information, the disaster information, and the inspection information which are used when the degree of similarity is determined. Note that FIG. 5 illustrates a two-dimensional space to simplify the description.

In FIG. 5, the maximum crack width is plotted as a first feature vector on a lateral axis, and the number of elapsed years after the start of use is plotted as a second feature vector on a vertical axis. A predetermined distance from damage of the target structure to be repaired is set as a threshold value, and damage having a distance less than or equal to this threshold value is extracted as similar damage. In FIG. 5, a circle centered at the target structure and represented by a broken line indicates that the distance is less than or equal to the threshold value.

When similar damage is extracted, a distance (Euclidean distance) based on parameters that are not weighted may be used, or a distance (Mahalanobis distance) based on weighted parameters may be used. How which parameter is weighted may be determined by a statistical method such as principal component analysis.

In addition to the determination described above, an additional search condition of a point or a range in the feature space can be designated as an individual parameter or another parameter. For example, when bridges having the completion date of Jan. 1, 1990 or later, bridges whose basic structure is the girder bridge, or the like are designated, damage similar to the damage of the target structure is extracted within this designated range.

Repair Method Presentation Unit

Figure 6:
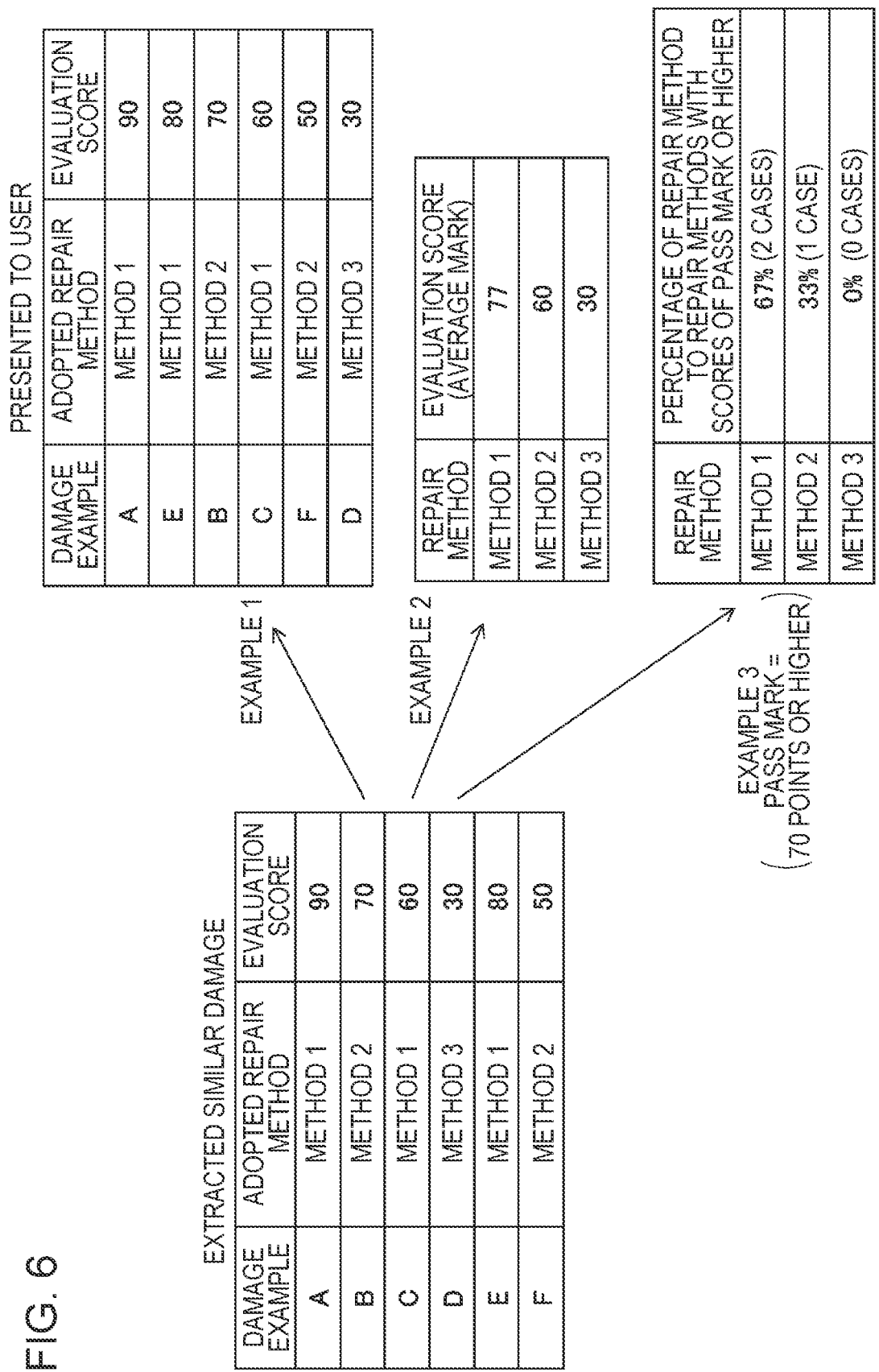
FIG. 6 is a diagram describing a method for presenting repair methods.

The repair method presentation unit 135 is a means for presenting repair methods adopted for the similar damage extracted by the similar damage extraction unit 130, on the basis of the evaluation score obtained by the repair evaluation unit 105. As for a method for presenting the repair methods, for example, the repair methods can be presented in the following manner. FIG. 6 is a diagram describing a method for presenting repair methods.

(1) The repair methods are listed and presented in descending order of the evaluation score.

Among the kinds of similar damage extracted by the similar damage extraction unit 130, repair methods adopted for kinds of similar damage having high degrees of similarity, for example, kinds of similar damage having the top 100 degrees of similarity are listed in descending order of the evaluation score (EXAMPLE 1).

(2) The repair methods having high average evaluation scores are listed and presented.

Among the kinds of similar damage extracted by the similar damage extraction unit 130, the evaluation scores for the repair methods adopted for the kinds of similar damage having high degrees of similarity, for example, the kinds of similar damage having the top 100 degrees of similarity are averaged for each repair method. The repair methods are listed in descending order of the average evaluation score (EXAMPLE 2).

(3) A percentage of each repair method with respect to the repair methods having the evaluation scores greater than or equal to a threshold value is presented.

Among the kinds of similar damage extracted by the similar damage extraction unit 130, for example, percentages of the respective repair methods having the evaluation scores greater than or equal to a predetermined threshold value (higher than or equal to a pass mark) with respect to the repair methods adopted for the kinds of similar damage having high degrees of similarity, for example, the kinds of similar damage having the top 100 degrees of similarity are presented along with the respective repair methods. For example, in EXAMPLE 3 of FIG. 6, among six kinds of similar damage (A to F), similar damage examples having scores of 70 points or higher are the damage examples A, B, and E. A method 1, a method 2, and the method 1 are adopted for the damage examples A, B, and E, respectively. That is, there are three damage examples having scores higher than or equal to the pass mark, and the method 1 is adopted for two examples and the method 2 is adopted for one example. Thus, "METHOD 1—67%" and "METHOD 2—33%" are presented.

FIG. 6 illustrates the six damage examples A to F as examples of damage to simplify the illustration. However, in practice, it is preferable to extract 100 damage cases up to the 100th place as described above and present the repair methods. In addition, the presentation of the repair methods is not limited to presentation based on only the evaluation scores, and the repair methods may be rated and listed in consideration of the cost, working time, and the like for the repair.

For example, in the case where the structure is a concrete member, examples of the repair methods to be presented include the following repair methods. As the crack repair method, crack covering or crack coating is performed for a crack having a crack width of about 0.2 mm or less, crack injection is performed for a crack having a crack width of about 0.2 mm to 1 mm, and crack filling is performed for a crack having a crack width of 1 mm or greater. Crack covering or crack coating is a method of covering the surface of a crack portion to block a deterioration factor. Crack injection is a method of injecting a resin or cement material to a crack. Crack filling is a method of cutting the surface in a U-shape over a width of about 10 mm along a crack and filling the cut with a repairing material.

As another repair method, there is a cross-section repair method. Ibis includes plastering, spraying, and filling. These are methods in which a deteriorated portion of concrete is removed, a formwork is installed at the removed portion, and a cross-section repairing material (such as shrinkage-compensating mortar or polymer cement mortar) is newly injected into the formwork to restore the cross section of concrete. As for plastering, spraying, and filling, various methods are selected depending on the defective area. As peeling prevention method for preventing peeling of the surface of the structure, a method for applying a protective film or attaching a peeling prevention sheet onto the surface of the structure is performed. In addition, examples of deterioration countermeasures for preventing deterioration of the structure include surface coating, surface impregnation, and electrolytic protection. Surface coating is a method of applying an epoxy resin coating or a cement material or attaching a sheet formed of these materials. Surface impregnation is a method of impregnating the inside from the surface with a material for suppressing deterioration and improving concrete. Electrolytic protection is a method of electrically preventing corrosion.

These typical repair methods for structures are described in "Bridge Repair Design Manual".

The repair method presentation unit 135 may select and present not only the type of the repair method described above but also the type (a manufacturer and a model number) of a material used in the repair method. Since the repair performance varies depending on the type of a repairing material, selection of the type of the material enables presentation of a more preferable repair method.

When the repair methods are presented, the repair times (such as the numbers of days or years from the last inspection date) of the respective kinds of damage may be presented. By presenting the repair times, the repair time of the target structure can be determined in accordance with the repair times of the similar damage in the database.

Information Acquisition Unit

The information acquisition unit 140 acquires a damage cause, structure information, environment information, and history information (hereinafter, also referred to as "information on the structure or the like") of the target structure to be repaired. As the damage cause, the structure information, the environment information, and the history information, information substantially the same as the information included in the database 110 described above is acquired.

When the information acquisition unit 140 acquires the information, the information can be input using an operation section (not illustrated). The operation section includes a keyboard and a mouse as input devices. When a monitor display unit 146 described later has a touch panel, the operation section also includes the touch panel. The user can input information on the structure or the like through these devices and the screen of the monitor display unit 146. The information acquisition unit 140 acquires the input information on the structure or the like.

Display Control Unit

The display control unit 145 includes the monitor display unit 146, and causes the monitor display unit 146 to display information such as the acquired captured image, the repair methods adopted for the extracted similar damage, and the repair times. The display control unit 145 controls the matters relating to the display screen such as information to be displayed on the monitor display unit 146. The monitor display unit 146 is a display device such as a liquid crystal display.

Output Unit

The output unit 150 outputs the repair methods presented by the repair method presentation unit 135 as text data or table data. The output unit 150 also outputs information on the acquired captured image, the repair time, and so on. These pieces of information may be output as data of a figure.

Procedure of Structure Repair Method Selection Method

Figure 7:
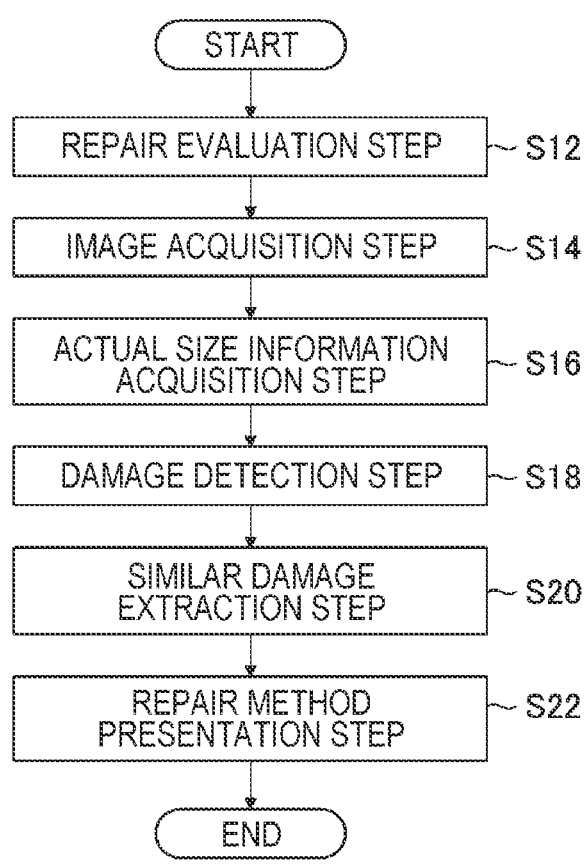
FIG. 7 is a flowchart of a structure repair method selection method.

A repair method selection method performed by the repair method selection system 100 will be described. FIG. 7 is a flowchart illustrating the procedure of the repair method selection method.

Repair Evaluation Step

A repair evaluation step is a step of obtaining an evaluation score from an inspection history of a structure after repair (step S12). Note that it is sufficient that evaluation is made when a structure is inspected. Thus, the repair evaluation step need not be performed at the beginning of the procedure of the repair method selection method.

Image Acquisition Step

An image acquisition step is a step of acquiring a captured image of a target structure to be repaired (step S14). The captured image is obtained by the digital camera 200. The repair method selection system 100 acquires a captured image via the digital camera 200 (the imaging optical system 210, the wireless communication unit 220, and the antenna 222), the antenna 117, and the image acquisition unit 115.

In the case where the captured image is a plurality of captured images (a group of image images), panoramic combining processing for combining the plurality of captured images into a single image is performed. In combination of the captured images, calculation of combination information, for example, calculation of correspondence points between the captured images and calculation of a projective transformation matrix on the basis of the correspondence points, is performed, and the images are combined on the basis of the correspondence points.

Actual Size Information Acquisition Step

In an actual size information acquisition step, an actual size of a characteristic portion of the target structure in the captured image acquired in the image acquisition step or an actual length of the target structure is acquired (step S16).

Damage Detection Step

A damage detection step is a step of detecting damage from the captured image acquired in the image acquisition step (step S18). A degree of the damage is also calculated on the basis of the information acquired in the actual size information acquisition step.

Similar Damage Extraction Step

In a similar damage extraction step, degrees of similarity of the damage detected in the damage detection step to kinds of damage of structures in the database 110 are determined using the database 110, and one or more kinds of similar damage having high degrees of similarity are extracted (step S20).

As for the extraction of similar damage, the structure may be periodically inspected after the repair. This inspection history may be recorded in the database 110. The degree of similarity may be determined on the basis of the chronological change based on this inspection record.

Repair Method Presentation Step

In a repair method presentation step, repair methods adopted for the kinds of similar damage extracted in the similar damage extraction step are presented on the basis of the evaluation score (step S22). In the presentation of repair methods, repair methods having evaluation scores of a predetermined score or higher are presented. Alternatively, the repair methods can be presented so that a more preferable repair method is easily selected, by using a method of presenting the repair methods in descending order of the evaluation score or the like.

Structure Repair Method Selection Server

Figure 8:
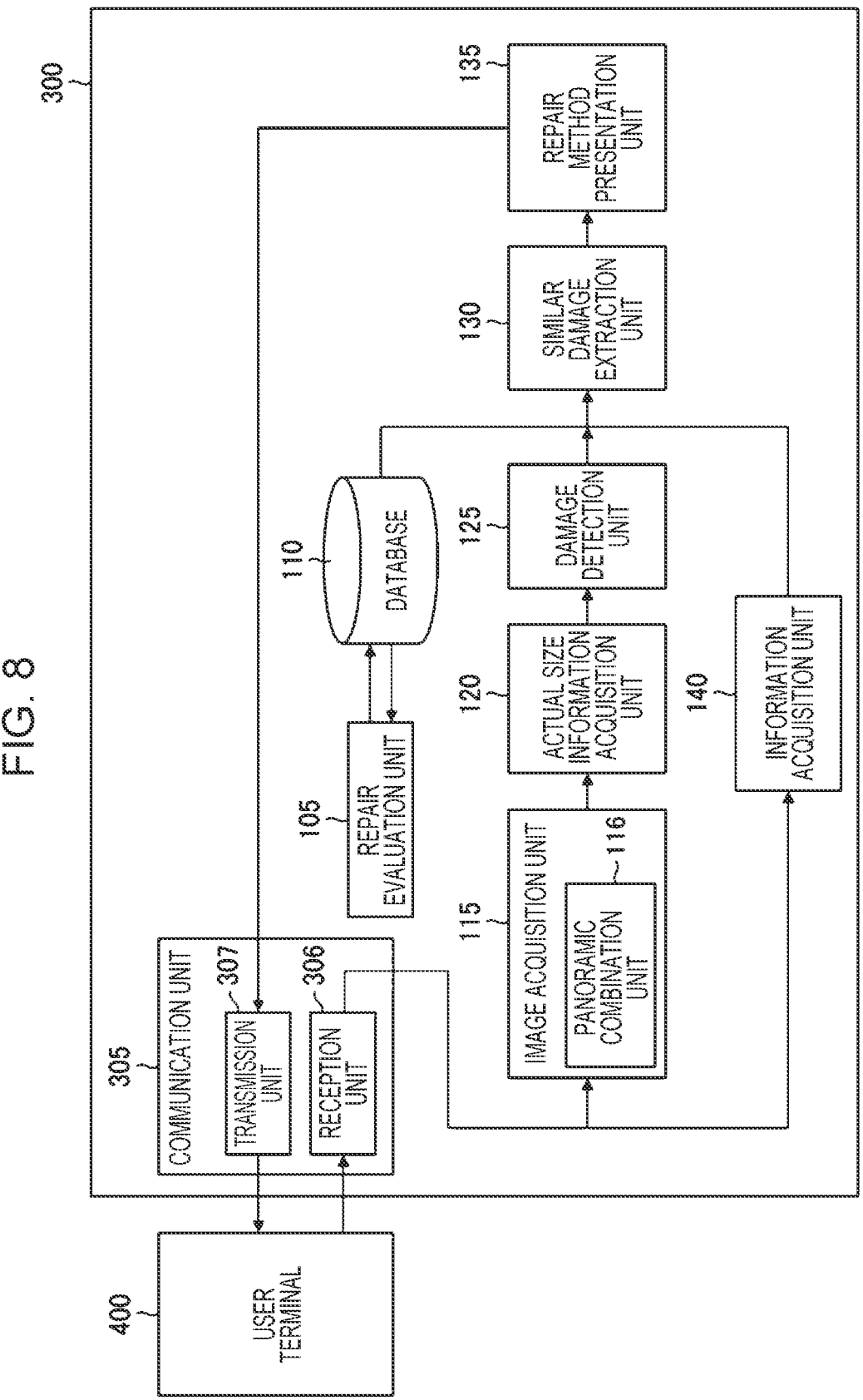
FIG. 8 is a block diagram illustrating a configuration of a structure repair method selection server.

FIG. 8 is a block diagram illustrating a schematic configuration of a repair method selection server 300 according to one embodiment of the present invention. The same components as those of the repair method selection system 100 illustrated in FIG. 2 are denoted by the same reference signs, and description thereof will be omitted below.

The repair method selection server 300 according to the present embodiment has the repair evaluation unit 105, the database 110, the image acquisition unit 115, the actual size information acquisition unit 120, the damage detection unit 125, the similar damage extraction unit 130, the repair method presentation unit 135, and a communication unit 305. The repair method selection server 300 may also include the information acquisition unit 140 that acquires information on a target structure to be repaired, that is, other information such as a damage cause and structure information held in association with the structure in the database 110.

The repair method selection server 300 includes the communication unit 305 and is connected to a user terminal 400 via a network. The communication unit 305 includes a reception unit 306 and a transmission unit 307. The reception unit 306 receives a captured image of a target structure to be repaired from the user terminal 400. The received captured image is transmitted to the image acquisition unit 115 and is processed in substantially the same manner as in the repair method selection system 100 illustrated in FIG. 2. The repair method presentation unit 135 presents preferable repair methods. The reception unit 306 may also receive information on the structure or the like input to the user terminal 400 and transmit the information to the information acquisition unit 140. The information may be used by the similar damage extraction unit 130 to determine the degree of similarity.

The repair methods presented by the repair method presentation unit 135 are transmitted to the communication unit 305. The transmission unit 307 transmits the presented repair methods to the user terminal 400. A user can select an optimum repair method by checking the presented repair methods on the user terminal 400.

As described above, the structure repair method selection system, the structure repair method selection method, and the structure repair method selection server according to the present embodiments enable a repair method suitable for damage of a target structure to be repaired to be appropriately selected by extracting kinds of similar damage from the database 110 and presenting repair methods for similar damage having high repair evaluation scores from among the kinds of similar damage.

In each of the embodiments described above, the hardware structure of the processing units that perform various processes, such as the repair evaluation unit 105, the database 110, the image acquisition unit 115, the panoramic combination unit 116, the actual size information acquisition unit 120, the damage detection unit 125, the similar damage extraction unit 130, the repair method presentation unit 135, the information acquisition unit 140, the display control unit 145, the output unit 150, the communication unit 305, the reception unit 306, and the transmission unit 307 is various processors as follows. The various processors include, for example, a central processing unit (CPU) which is a general-purpose processor that executes software (program) to function as the various processing units; a programmable logic device (PLD) which is a processor whose circuit configuration is changeable after manufacture, such as a field programmable gate array (FPGA); and a dedicated electric circuitry which is a processor having a circuit configuration designed exclusively for executing a specific process, such as an application-specific integrated circuit (ASIC).

A single processing unit may be implemented by one of these various processors, or may be implemented by two or more processors of the same kind or of different kinds (for example, a plurality of FPGAs or a combination of a CPU and an FPGA). In addition, the plurality of processing units may be implemented by a single processor. Examples in which the plurality of processing units are implemented by a single processor include a first configuration, as exemplified by a computer such as a client or a server, in which a combination of one or more CPUs and software constitutes a single processor and this processor functions as the plurality of processing units. The examples also include a second configuration, as exemplified by a system on chip (SoC) or the like, in which a processor that implements the functions of the entire system including the plurality of processing units with a single integrated circuit (IC) chip is used. As described above, the various processing units are implemented using one or more of the various processors described above in terms of the hardware structure.

Further, the hardware structure of these various processors is, more specifically, electric circuitry in which circuit elements such as semiconductor elements are combined.

The description above can be grasped as a structure repair method selection system described in Appendix 1 below.

[Appendix 1]

A structure repair method selection system including:

a processor that obtains an evaluation score for a structure from an inspection history of a structure after repair; and a memory that has data of a captured image of the structure before the repair, an adopted repair method, a repair time, the inspection history of the structure after the repair, and the evaluation score, the processor acquires an actual size of a characteristic portion of a target structure in a captured image or an actual length of the target structure, detects damage from the captured image acquired by the image acquisition unit, and calculates a degree of the damage, based on information acquired by the actual size information acquisition unit, determines a degree of similarity of the detected damage to damage of the structure included in the memory, and extracts one or more kinds of similar damage for which the degree of similarity is high, and presenting, based on the evaluation score, a repair method adopted for the similar damage extracted by the similar damage extraction unit.

REFERENCE SIGNS LIST 1 bridge
2 main girder
3 cross beam
4 sway bracing
5 lateral bracing
6 deck slab
100 repair method selection system
105 repair evaluation unit
110 database
115 image acquisition unit
116 panoramic combination unit
117, 222 antenna
120 actual size information acquisition unit
125 damage detection unit
130 similar damage extraction unit
135 repair method presentation unit
140 information acquisition unit
145 display control unit
146 monitor display unit
150 output unit
200 digital camera
210 imaging optical system
220 wireless communication unit
300 repair method selection server
305 communication unit
306 reception unit
307 transmission unit
400 user terminal

What is claimed is:

1. A structure repair method selection system comprising:
a database that records thereon, data of a captured image of at least one structure before repair, an adopted repair method, a repair time, and inspection history of the at least one structure after repair; and at least one processor configured to:

obtain an evaluation score for the at least one structure from the inspection history of the at least one structure after repair, and record the evaluation score on the database;

acquire a captured image of a target structure to be repaired;

acquire size information regarding an actual size of a characteristic portion of the target structure in the captured image or an actual length of the target structure;

detect damage of the target structure from the captured image and calculate a degree of the damage based on the size information;

determine a degree of similarity between the damage of the target structure and damage of the at least one structure recorded on the database, and extract one or more kinds of damage for which the degree of similarity is high as similar damage; and present, based on the evaluation score, repair methods adopted for the kinds of similar damage as repair methods for the target structure, wherein the at least one processor is further configured to present a repair method for which the evaluation score is higher than or equal to a predetermined score from among the repair methods, or presents the repair methods in descending order of the evaluation score.

2. The structure repair method selection system according to claim 1, wherein the at least one processor is further configured to acquire chronological images of the target structure.

3. The structure repair method selection system according to claim 2, wherein the at least one processor is further configured to determine the degree of similarity, based on chronological changes in a position of the damage and the degree of the damage in the chronological images, and extract the similar damage.

4. The structure repair method selection system according to claim 1, wherein the at least one processor is further configured to weight each piece of information.

5. A structure repair method selection system comprising:

a database that records thereon, data of a captured image of at least one structure before repair, an adopted repair method, a repair time, and inspection history of the at least one structure after repair; and at least one processor configured to:

obtain an evaluation score for the at least one structure from the inspection history of the at least one structure after repair, and record the evaluation score on the database;

acquire a captured image of a target structure to be repaired;

acquire size information regarding an actual size of a characteristic portion of the target structure in the captured image or an actual length of the target structure;

detect damage of the target structure from the captured image and calculate a degree of the damage based on the size information;

determine a degree of similarity between the damage of the target structure and damage of the at least one structure recorded on the database, and extract one or more kinds of damage for which the degree of similarity is high as similar damage; and present, based on the evaluation score, repair methods adopted for the kinds of similar damage as repair methods for the target structure, wherein the evaluation score is obtained from chronological changes in a damage rank, a countermeasure class, and a degree of soundness of the structure and chronological changes in a position of the damage and the degree of the damage.

6. The structure repair method selection system according to claim 5, wherein the at least one processor is further configured to weight each piece of information.

7. A structure repair method selection system comprising:

a database that records thereon, data of a captured image of at least one structure before repair, an adopted repair method, a repair time, and inspection history of the at least one structure after repair; and at least one processor configured to:

obtain an evaluation score for the at least one structure from the inspection history of the at least one structure after repair, and record the evaluation score on the database;

acquire a captured image of a target structure to be repaired;

acquire size information regarding an actual size of a characteristic portion of the target structure in the captured image or an actual length of the target structure;

detect damage of the target structure from the captured image and calculate a degree of the damage based on the size information;

determine a degree of similarity between the damage of the target structure and damage of the at least one structure recorded on the database, and extract one or more kinds of damage for which the degree of similarity is high as similar damage; and present, based on the evaluation score, repair methods adopted for the kinds of similar damage as repair methods for the target structure, wherein the database has damage information of the structure, the damage information including a type of the damage, a position of the damage, and the degree of the damage.

8. The structure repair method selection system according to claim 7:

wherein the database records thereon at least one or more pieces of information of a damage cause, structure information, environment information, or history information, the at least one processor is further configured to acquire at least one or more pieces of information of a damage cause, structure information, environment information, or history information of the target structure, and the at least one processor is further configured to determine the degree of similarity, based on the acquired at least one or more pieces of information of the damage cause, the structure information, the environment information, or the history information in addition to the damage information.

9. The structure repair method selection system according to claim 8, wherein the at least one processor is further configured to weight each piece of information.

10. The structure repair method selection system according to claim 7, wherein the at least one processor is further configured to weight each piece of information.

11. A structure repair method selection system comprising:
a database that records thereon, data of a captured image of at least one structure before repair, an adopted repair method, a repair time, and inspection history of the at least one structure after repair; and
at least one processor configured to:
obtain an evaluation score for the at least one structure from the inspection history of the at least one structure after repair, and record the evaluation score on the database;
acquire a captured image of a target structure to be repaired;
acquire size information regarding an actual size of a characteristic portion of the target structure in the captured image or an actual length of the target structure;
detect damage of the target structure from the captured image and calculate a degree of the damage based on the size information;
determine a degree of similarity between the damage of the target structure and damage of the at least one structure recorded on the database, and extract one or more kinds of damage for which the degree of similarity is high as similar damage; and
present, based on the evaluation score, repair methods adopted for the kinds of similar damage as repair methods for the target structure, wherein
the at least one processor is further configured to acquire group of images obtained by capturing images of segments of the target structure, and
the at least one processor is further configured to perform panoramic combination processing on the group of images.

12. The structure repair method selection system according to claim 11, wherein the at least one processor is further configured to weight each piece of information.

13. A structure repair method selection system comprising:
a database that records thereon, data of a captured image of at least one structure before repair, an adopted repair method, a repair time, and inspection history of the at least one structure after repair; and
at least one processor configured to:
obtain an evaluation score for the at least one structure from the inspection history of the at least one structure after repair, and record the evaluation score on the database;
acquire a captured image of a target structure to be repaired;
acquire size information regarding an actual size of a characteristic portion of the target structure in the captured image or an actual length of the target structure;
detect damage of the target structure from the captured image and calculate a degree of the damage based on the size information;
determine a degree of similarity between the damage of the target structure and damage of the at least one structure recorded on the database, and extract one or more kinds of damage for which the degree of similarity is high as similar damage; and
present, based on the evaluation score, repair methods adopted for the kinds of similar damage as repair methods for the target structure, wherein
the database includes a repair time for the structure, the repair time including information on a number of years elapsed from a start of use of the at least one structure or a number of days or years elapsed from a last inspection date, and
the at least one processor is further configured to present the repair time in addition to the repair method.

14. The structure repair method selection system according to claim 13, wherein the at least one processor is further configured to weight each piece of information.

15. A structure repair method selection system comprising:
a database that records thereon, data of a captured image of at least one structure before repair, an adopted repair method, a repair time, and inspection history of the at least one structure after repair; and
at least one processor configured to:
obtain an evaluation score for the at least one structure from the inspection history of the at least one structure after repair, and record the evaluation score on the database;
acquire a captured image of a target structure to be repaired;
acquire size information regarding an actual size of a characteristic portion of the target structure in the captured image or an actual length of the target structure;
detect damage of the target structure from the captured image and calculate a degree of the damage based on the size information;
determine a degree of similarity between the damage of the target structure and damage of the at least one structure recorded on the database, and extract one or more kinds of damage for which the degree of similarity is high as similar damage; and
present, based on the evaluation score, repair methods adopted for the kinds of similar damage as repair methods for the target structure,
wherein the at least one processor is further configured to present a repairing material in addition to the repair method.

16. The structure repair method selection system according to claim 15, wherein the at least one processor is further configured to weight each piece of information.

17. A structure repair method selection system comprising:
a database that records thereon, data of a captured image of at least one structure before repair, an adopted repair method, a repair time, and inspection history of the at least one structure after repair; and
at least one processor configured to:
obtain an evaluation score for the at least one structure from the inspection history of the at least one structure after repair, and record the evaluation score on the database;
acquire a captured image of a target structure to be repaired;
acquire size information regarding an actual size of a characteristic portion of the target structure in the captured image or an actual length of the target structure;
detect damage of the target structure from the captured image and calculate a degree of the damage based on the size information;
determine a degree of similarity between the damage of the target structure and damage of the at least one structure recorded on the database, and extract one or more kinds of damage for which the degree of similarity is high as similar damage; and present, based on the evaluation score, repair methods adopted for the kinds of similar damage as repair methods for the target structure, wherein the at least one processor is further configured to weight each piece of information.

18. A structure repair method selection method comprising:

recording, on a database, data of a captured image of at least one structure before repair, an adopted repair method, a repair time, and inspection history of the at least one structure after repair;

obtaining an evaluation score for the at least one structure from the inspection history of the at least one structure after repair, and recording the evaluation score on the database;

acquiring a captured image of a target structure to be repaired;

acquiring size information regarding an actual size of a characteristic portion of the target structure in the captured image or an actual length of the target structure;

detecting damage of the target structure from the captured image and calculating a degree of the damage based on the size information;

determining a degree of similarity between the damage of the target structure and damage of the at least one structure recorded on the database, and extracting one or more kinds of damage for which the degree of similarity is high as similar damage; and presenting, based on the evaluation score, repair methods adopted for the kinds of similar damage as repair methods for the target structure, wherein presenting the repair methods includes presenting a repair method for which the evaluation score is higher than or equal to a predetermined score from among the repair methods, or presenting the repair methods in descending order of the evaluation score.

19. A structure repair method selection server that is connected to a user terminal via a network and selects a repair method for a target structure to be repaired, the structure repair method selection server comprising:

a database that records thereon, data of a captured image of at least one structure before repair, an adopted repair method, a repair time, and inspection history of the at least one structure after repair; and at least one processor configured to:

obtain an evaluation score for the at least one structure from the inspection history of the at least one structure after repair, and record the evaluation score on the database;

receive a captured image of the target structure via the network, the captured image obtained by the user terminal;

acquire size information regarding an actual size of a characteristic portion of the target structure in the captured image or an actual length of the target structure;

detect damage of the target structure from the captured image and calculate a degree of the damage based on the size information;

determine a degree of similarity between the damage of the target structure and damage of the at least one structure recorded on the database, and extract one or more kinds of damage for which the degree of similarity is high as similar damage; and transmit to the user terminal repair methods adopted for the kinds of similar damage as repair methods for the target structure based on the evaluation score, wherein transmitting the repair methods includes transmitting a repair method for which the evaluation score is higher than or equal to a predetermined score from among the repair methods, or transmitting the repair methods in descending order of the evaluation score.

* * * * *